United States Patent
Hsu et al.

(10) Patent No.: US 12,026,851 B2
(45) Date of Patent: Jul. 2, 2024

(54) SINGLE IMAGE DERAINING METHOD AND SYSTEM THEREOF

(71) Applicant: NATIONAL CHUNG CHENG UNIVERSITY, Chiayi (TW)

(72) Inventors: Wei-Yen Hsu, Chiayi (TW); Cheng-Han Tsai, Chia-yi County (TW)

(73) Assignee: NATIONAL CHUNG CHENG UNIVERSITY, Chiayi (TW)

(*) Notice: Subject to any disclaimer, the term of this patent is extended or adjusted under 35 U.S.C. 154(b) by 385 days.

(21) Appl. No.: 17/452,573

(22) Filed: Oct. 28, 2021

(65) Prior Publication Data
US 2023/0060736 A1 Mar. 2, 2023

(30) Foreign Application Priority Data
Aug. 31, 2021 (TW) .................. 110132331

(51) Int. Cl.
 *G06T 5/10* (2006.01)
 *G06T 5/00* (2006.01)
 *G06T 5/50* (2006.01)
(52) U.S. Cl.
 CPC .......... *G06T 5/10* (2013.01); *G06T 5/00* (2013.01); *G06T 5/50* (2013.01);
 (Continued)
(58) Field of Classification Search
 None
 See application file for complete search history.

(56) References Cited

U.S. PATENT DOCUMENTS

| | | | |
|---|---|---|---|
| 10,282,827 B2 | 5/2019 | Ulaganathan et al. | |
| 2015/0310593 A1* | 10/2015 | Kobayashi | G06T 5/10 |
| | | | 382/275 |

FOREIGN PATENT DOCUMENTS

| | | | |
|---|---|---|---|
| CN | 103337061 B | 2/2016 | |
| CN | 108648159 A | 10/2018 | |
| CN | 108648159 A | * 10/2018 | ........... G06N 3/0454 |

OTHER PUBLICATIONS

W. Yang, J. Liu, S. Yang and Z. Guo, "Scale-Free Single Image Deraining Via Visibility-Enhanced Recurrent Wavelet Learning," in IEEE Transactions on Image Processing, vol. 28, No. 6, pp. 2948-2961, Jun. 2019, doi: 10.1109/TIP.2019.2892685. (Year: 2019).*

(Continued)

*Primary Examiner* — Amandeep Saini
*Assistant Examiner* — Caroline Tabancay Duffy
(74) *Attorney, Agent, or Firm* — CKC & Partners Co., LLC (57) ABSTRACT

A single image deraining method is proposed. A wavelet transforming step processes an initial rain image to generate an i-th stage low-frequency rain image and a plurality of i-th stage high-frequency rain images. An image deraining step inputs the i-th stage low-frequency rain image to a low-frequency deraining model to output an i-th stage low-frequency derain image. A first inverse wavelet transforming step recombines the n-th stage low-frequency derain image with the n-th stage high-frequency derain images to form an n-th stage derain image. A weighted blending step blends a (n−1)-th stage low-frequency derain image with the n-th stage derain image to generate a (n−1)-th stage blended derain image. A second inverse wavelet transforming step recombines the (n−1)-th stage high-frequency derain images with the (n−1)-th stage blended derain image to form a (n−1)-th stage derain image, and sets n to n−1 and repeats the last two steps.

11 Claims, 8 Drawing Sheets

(52) U.S. Cl.
CPC ............... *G06T 2207/20064* (2013.01); *G06T 2207/20081* (2013.01); *G06T 2207/20084* (2013.01); *G06T 2207/20221* (2013.01); *G06T 2207/30192* (2013.01)

(56) References Cited

OTHER PUBLICATIONS

Zheng, Xianhui, et al. "Single-image-based rain and snow removal using multi-guided filter." Neural Information Processing: 20th International Conference, ICONIP 2013, Daegu, Korea, Nov. 3-7, 2013. Proceedings, Part III 20. Springer Berlin Heidelberg, 2013. (Year: 2013).*

* cited by examiner

SINGLE IMAGE DERAINING METHOD AND SYSTEM THEREOF

RELATED APPLICATIONS

This application claims priority to Taiwan Application Serial Number 110132331, filed Aug. 31, 2021, which is herein incorporated by reference.

BACKGROUND

Technical Field

The present disclosure relates to an image processing method and a system thereof. More particularly, the present disclosure relates to a single image deraining method focusing on a low-frequency wavelet and a system thereof.

Description of Related Art

The algorithms of human vision and computer vision are affected by rain streaks and rain accumulation. Raining adversely affects the visual quality of videos and images, and reduces the performance of the visual system. Therefore, the restoration of the videos and the images degraded by raining can effectively improve the accuracy of computer vision systems applied to outdoor scenes.

The video deraining method uses the temporal redundancy and the rainfall dynamics to remove rain, but the image deraining method lacks time information, and can only use the spatial information of adjacent pixels and the visual characteristics of the rainfall and background scenes. Hence, removing rain from an image is obviously more challenging than removing rain from a video of a series of image frames.

In recent years, deep learning combined with the image priors has been widely used in the field of image deraining, but there are still two main limitations. First, the conventional image deraining method usually only performs a deraining procedure on the high-frequency part of a rain image, but pays less attention to the low-frequency part of the rain image. Second, the rain streaks and the edges of objects are mixed with the background scenes. Therefore, it is difficult for the model in the conventional image deraining method to separate rainwater and background information, resulting in blurry edges of the derain image.

In view of the problems of the conventional image deraining method, how to establish a single image deraining method focusing on a low-frequency wavelet and a system thereof is indeed highly anticipated by the public and become the goal and the direction of relevant industry efforts.

SUMMARY

According to one aspect of the present disclosure, a single image deraining method is configured to convert an initial rain image into a final derain image. The single image deraining method includes performing a wavelet transforming step, an image deraining step, a first inverse wavelet transforming step, a weighted blending step and a second inverse wavelet transforming step. The wavelet transforming step is performed to drive a processing unit to process the initial rain image to generate a first stage low-frequency rain image, a plurality of first stage high-frequency rain images, a second stage low-frequency rain image and a plurality of second stage high-frequency rain images according to a wavelet transforming procedure. The image deraining step is performed to drive the processing unit to input the first stage low-frequency rain image and the second stage low-frequency rain image to a low-frequency deraining model to output a first stage low-frequency derain image and a second stage low-frequency derain image, and input the first stage high-frequency rain images and the second stage high-frequency rain images to a high-frequency deraining model to output a plurality of first stage high-frequency derain images and a plurality of second stage high-frequency derain images. The first inverse wavelet transforming step is performed to drive the processing unit to recombine the second stage low-frequency derain image with the second stage high-frequency rain images to form a second stage derain image according to a first inverse wavelet transforming procedure. The weighted blending step is performed to drive the processing unit to blend the first stage low-frequency derain image with the second stage derain image to generate a first stage blended derain image according to a weighted blending procedure. The second inverse wavelet transforming step is performed to drive the processing unit to recombine the first stage high-frequency derain images with the first stage blended derain image to form the final derain image according to a second inverse wavelet transforming procedure.

According to another aspect of the present disclosure, a single image deraining method is configured to convert an initial rain image into a final derain image. The single image deraining method includes performing a wavelet transforming step, an image deraining step, a first inverse wavelet transforming step, a weighted blending step, a second inverse wavelet transforming step and a residual network learning step. The wavelet transforming step is performed to drive a processing unit to process the initial rain image to generate an i-th stage low-frequency rain image and a plurality of i-th stage high-frequency rain images according to a wavelet transforming procedure, wherein i is 1 to n, i and n are both positive integers, and n is greater than or equal to 3. The image deraining step is performed to drive the processing unit to input the i-th stage low-frequency rain image to a low-frequency deraining model to output an i-th stage low-frequency derain image, and input the i-th stage high-frequency rain images to a high-frequency deraining model to output a plurality of i-th stage high-frequency derain images. The first inverse wavelet transforming step is performed to drive the processing unit to recombine the n-th stage low-frequency derain image with the n-th stage high-frequency rain images to form an n-th stage derain image according to a first inverse wavelet transforming procedure. The weighted blending step is performed to drive the processing unit to blend the (n−1)-th stage low-frequency derain image with the n-th stage derain image to generate a (n−1)-th stage blended derain image according to a weighted blending procedure. The second inverse wavelet transforming step is performed to drive the processing unit to recombine the (n−1)-th stage high-frequency derain images with the (n−1)-th stage blended derain image to form a (n−1)-th stage derain image according to a second inverse wavelet transforming procedure, and then the processing unit sets n to n−1. The residual network learning step is performed to drive the processing unit to repeatedly execute the weighted blending step and the second inverse wavelet transforming step according to n until n=2. In response to determining that n=2 in the residual network learning step, the (n−1)-th stage derain image of the second inverse wavelet transforming step is the final derain image.

According to yet another aspect of the present disclosure, a single image deraining system is configured to convert an initial rain image into a final derain image. The single image deraining system includes a storing unit and a processing unit. The storing unit is configured to access the initial rain image, a wavelet transforming procedure, a low-frequency deraining model, a high-frequency deraining model, a first inverse wavelet transforming procedure, a weighted blending procedure and a second inverse wavelet transforming procedure. The processing unit is connected to the storing unit and configured to implement a single image deraining method including performing a wavelet transforming step, an image deraining step, a first inverse wavelet transforming step, a weighted blending step and a second inverse wavelet transforming step. The wavelet transforming step is performed to process the initial rain image to generate a first stage low-frequency rain image, a plurality of first stage high-frequency rain images, a second stage low-frequency rain image and a plurality of second stage high-frequency rain images according to the wavelet transforming procedure. The image deraining step is performed to input the first stage low-frequency rain image and the second stage low-frequency rain image to the low-frequency deraining model to output a first stage low-frequency derain image and a second stage low-frequency derain image, and input the first stage high-frequency rain images and the second stage high-frequency rain images to the high-frequency deraining model to output a plurality of first stage high-frequency derain images and a plurality of second stage high-frequency derain images. The first inverse wavelet transforming step is performed to recombine the second stage low-frequency derain image with the second stage high-frequency rain images to form a second stage derain image according to the first inverse wavelet transforming procedure. The weighted blending step is performed to blend the first stage low-frequency derain image with the second stage derain image to generate a first stage blended derain image according to the weighted blending procedure. The second inverse wavelet transforming step is performed to recombine the first stage high-frequency derain images with the first stage blended derain image to form the final derain image according to the second inverse wavelet transforming procedure.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
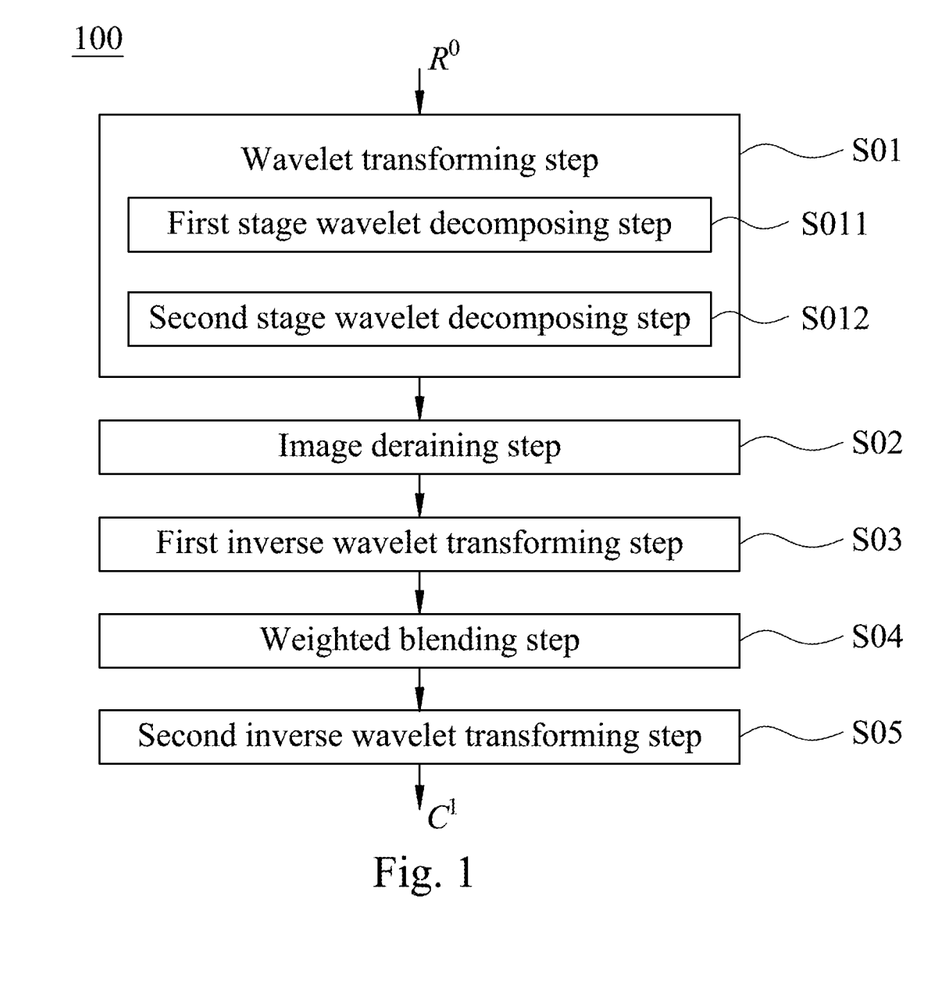
FIG. 1 shows a flow chart of a single image deraining method according to a first embodiment of the present disclosure.
Figure 2:
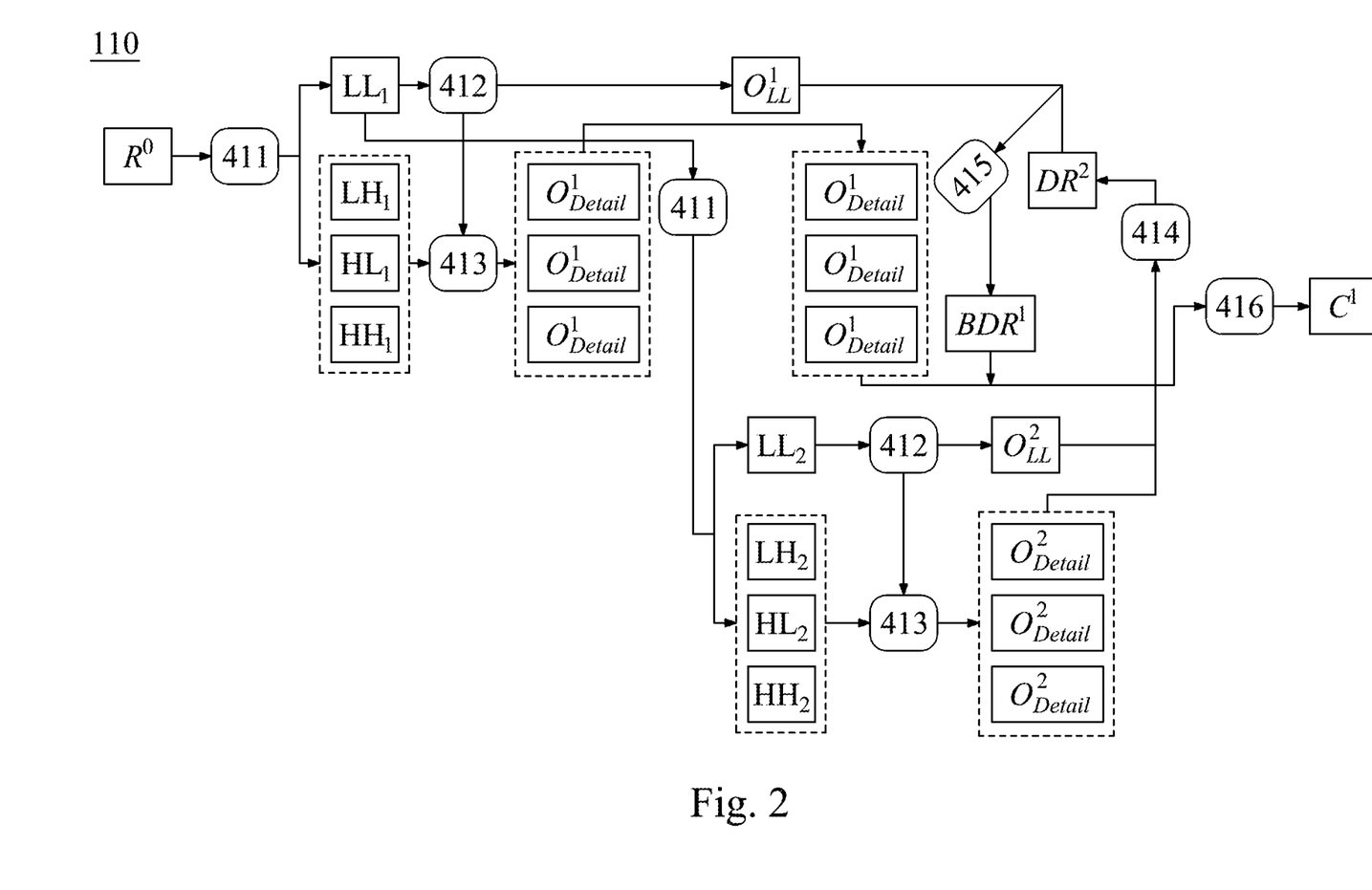
FIG. 2 shows a schematic view of a Wavelet Approximation-Attention Residual (WAAR) of the single image deraining method of the first embodiment of the present disclosure.

Please refer to FIGS. 1 and 2. FIG. 1 shows a flow chart of a single image deraining method 100 according to a first embodiment of the present disclosure. FIG. 2 shows a schematic view of a Wavelet Approximation-Attention Residual (WAAR) 110 of the single image deraining method 100 of the first embodiment of the present disclosure. In FIGS. 1 and 2, the single image deraining method 100 is configured to convert an initial rain image $R^0$ into a final derain image $C^1$, and includes performing a wavelet transforming step S01, an image deraining step S02, a first inverse wavelet transforming step S03, a weighted blending step S04 and a second inverse wavelet transforming step S05.

The wavelet transforming step S01 is performed to drive a processing unit to process the initial rain image $R^0$ to generate a first stage low-frequency rain image $LL_1$, a plurality of first stage high-frequency rain images $LH_1$, $HL_1$, $HH_1$, a second stage low-frequency rain image $LL_2$ and a plurality of second stage high-frequency rain images $LH_2$, $HL_2$, $HH_2$ according to a wavelet transforming procedure 411.

The image deraining step S02 is performed to drive the processing unit to input the first stage low-frequency rain image $LL_1$ and the second stage low-frequency rain image $LL_2$ to a low-frequency deraining model 412 to output a first stage low-frequency derain image $O_{LL}^1$ and a second stage low-frequency derain image $O_{LL}^2$, and input the first stage high-frequency rain images $LH_1$, $HL_1$, $HH_1$ and the second stage high-frequency rain images $LH_2$, $HL_2$, $HH_2$ to a high-frequency deraining model 413 to output a plurality of first stage high-frequency derain images $O_{Detail}^1$ and a plurality of second stage high-frequency derain images $O_{Detail}^2$.

The first inverse wavelet transforming step S03 is performed to drive the processing unit to recombine the second stage low-frequency derain image $O_{LL}^2$ with the second stage high-frequency rain images $O_{Detail}^2$ to form a second stage derain image $DR^2$ according to a first inverse wavelet transforming procedure 414.

The weighted blending step S04 is performed to drive the processing unit to blend the first stage low-frequency derain image $O_{LL}^1$ with the second stage derain image $DR^2$ to generate a first stage blended derain image $BDR^1$ according to a weighted blending procedure 415.

The second inverse wavelet transforming step S05 is performed to drive the processing unit to recombine the first stage high-frequency derain images $O_{Detail}^1$ with the first stage blended derain image $BDR^1$ to form the final derain image $C^1$ according to a second inverse wavelet transforming procedure 416.

Therefore, the single image deraining method 100 of the present disclosure decomposes the initial rain image $R^0$ through a Stationary Wavelet Transform (SWT), and uses the low-frequency deraining model 412 and the high-frequency deraining model 413 to remove the rain patterns. Then, the processing unit performs an Inverse Stationary Wavelet Transform (ISWT) on the second stage low-frequency derain image $O_{LL}^2$ and the second stage high-frequency rain images $O_{Detail}^2$, and then performs an Image Weighted Blending (IWB) with the first stage low-frequency derain image $O_{LL}^1$. Finally, the processing unit performs another inverse stationary wavelet transform on the first stage high-frequency derain images $O_{Detail}^1$ and the first stage blended derain image $BDR^1$ to generate the final derain image $C^1$ so as to restore the initial rain image $R^0$ to the final derain image $C^1$ having a clean background.

Figure 3:
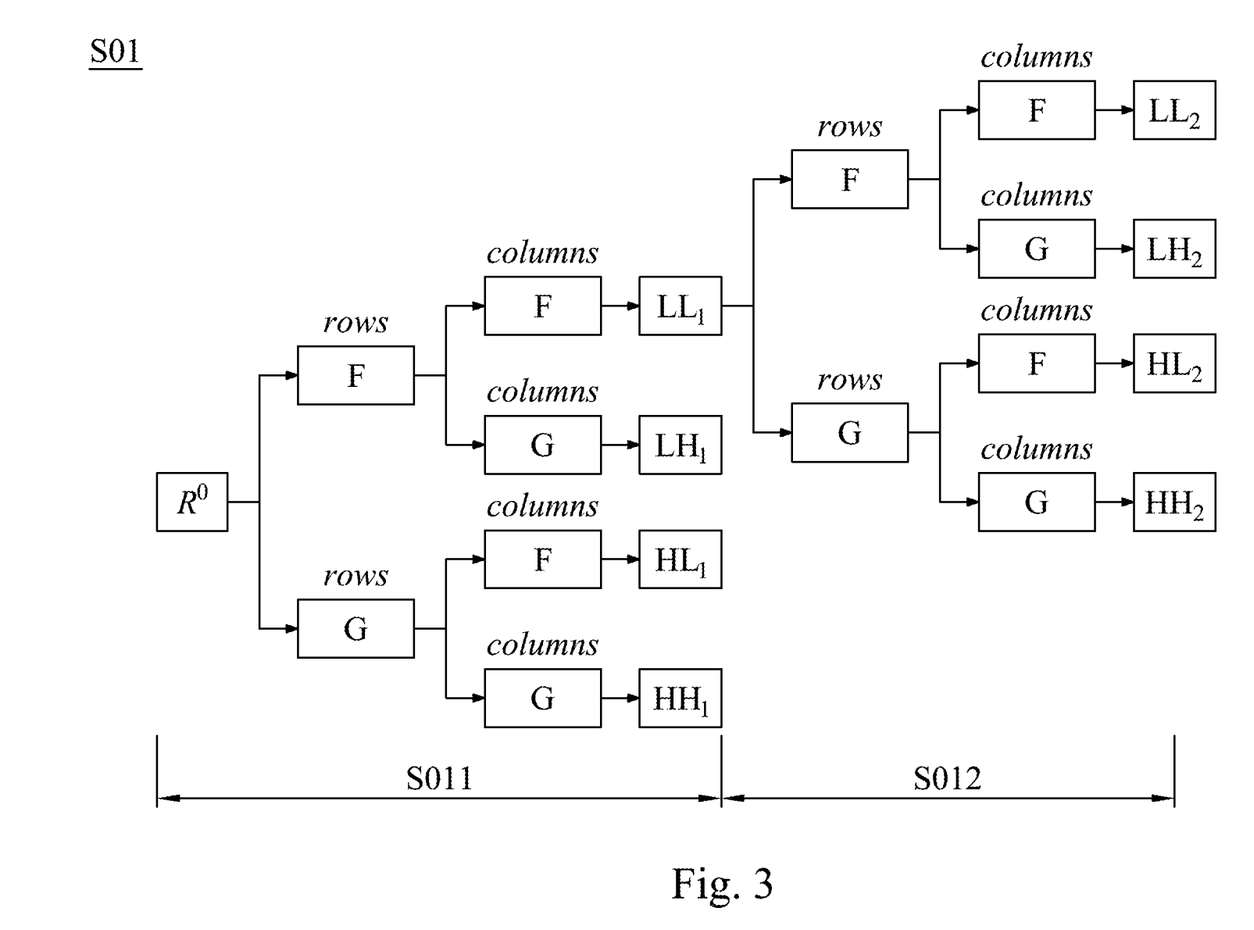
FIG. 3 shows a schematic view of a wavelet transforming step of the single image deraining method of FIG. 1.

Please refer to FIGS. 1, 2 and 3. FIG. 3 shows a schematic view of a wavelet transforming step S01 of the single image deraining method 100 of FIG. 1. In FIG. 1, the wavelet transforming step S01 includes a first stage wavelet decomposing step S011 and a second stage wavelet decomposing step S012. The first stage wavelet decomposing step S011 is performed to drive the processing unit to decompose the initial rain image $R^0$ into the first stage low-frequency rain image $LL_1$ and the first stage high-frequency rain images $LH_1$, $HL_1$, $HH_1$ according to the wavelet transforming procedure 411. The second stage wavelet decomposing step S012 is performed to drive the processing unit to decompose the first stage low-frequency rain image $LL_1$ into the second stage low-frequency rain image $LL_2$ and the second stage high-frequency rain images $LH_2$, $HL_2$, $HH_2$ according to the wavelet transforming procedure 411.

In FIG. 3, according to the first stage wavelet decomposing step S011, the processing unit uses a low-pass filter F and a high-pass filter G to perform the first time of a horizontal decomposition (i.e., rows in FIG. 3) and a vertical decomposition (i.e., columns in FIG. 3) on the initial rain image $R^0$ to generate four frequency bands with different frequencies (that is, the first stage low-frequency rain image $LL_1$ and the first stage high-frequency rain images $LH_1$, $HL_1$, $HH_1$). In detail, the initial rain image $R^0$ is input to the low-pass filter F, and the low-pass filter F filters out the high-frequency part of the initial rain image $R^0$ and outputs the low-frequency part of the initial rain image $R^0$; the initial rain image $R^0$ is input to the high-pass filter G, and the high-pass filter G filters out the low-frequency part of the initial rain image $R^0$ and outputs the high-frequency part of the initial rain image $R^0$. After that, according to the second stage wavelet decomposing step S012, the processing unit performs the second time of the horizontal decomposition and the vertical decomposition on the first stage low-frequency rain image $LL_1$ to generate the other four frequency bands with different frequencies (that is, the second stage low-frequency rain image $LL_2$ and the second stage high-frequency rain images $LH_2$, $HL_2$, $HH_2$).

In specific, the wavelet transforming procedure 411 includes a wavelet transforming function, the initial rain image, a first stage low-frequency wavelet coefficient, a plurality of first stage high-frequency wavelet coefficients, a second stage low-frequency wavelet coefficient and a plurality of second stage high-frequency wavelet coefficients. The wavelet transforming function is represented as SWT, the initial rain image is represented as $R^0$, the first stage low-frequency wavelet coefficient is represented as $I_{LL}^1$, the first stage high-frequency wavelet coefficients are represented as $I_{LH}^1$, $I_{HL}^1$ and $I_{HH}^1$, respectively, the second stage low-frequency wavelet coefficient is represented as $I_{LL}^2$, and the second stage high-frequency wavelet coefficients are represented as $I_{LH}^2$, $I_{HL}^2$, and $I_{HH}^2$, respectively, and conform to two following equations (1) and (2):

$$SWT(R^0)=[I_{LL}^1,I_{LH}^1,I_{HL}^1,I_{HH}^1] \quad (1);$$

$$SWT(I_{LL}^1)=[I_{LL}^2,I_{LH}^2,I_{HL}^2,I_{HH}^2] \quad (2);$$

The first stage low-frequency wavelet coefficient $I_{LL}^1$ corresponds to the first stage low-frequency rain image $LL_1$ and contains the smooth part of the image. The first stage high-frequency wavelet coefficients $I_{LH}^1$, $I_{HL}^1$, $I_{HH}^1$, correspond to the first stage high-frequency rain images $LH_1$, $HL_1$, $HH_1$ and contain the vertical details, the horizontal details and the diagonal details of the image, respectively. Likewise, the second stage low-frequency wavelet coefficient $I_{LL}^2$ corresponds to the second stage low-frequency rain image $LL_2$. The second stage high-frequency wavelet coefficients $I_{LH}^2$, $I_{HL}^2$, $I_{HH}^2$ correspond to the second stage high-frequency rain images $LH_2$, $HL_2$, $HH_2$, respectively. The wavelet transforming function can be a Haar Wavelet, but the present disclosure is not limited thereto.

Figure 4:
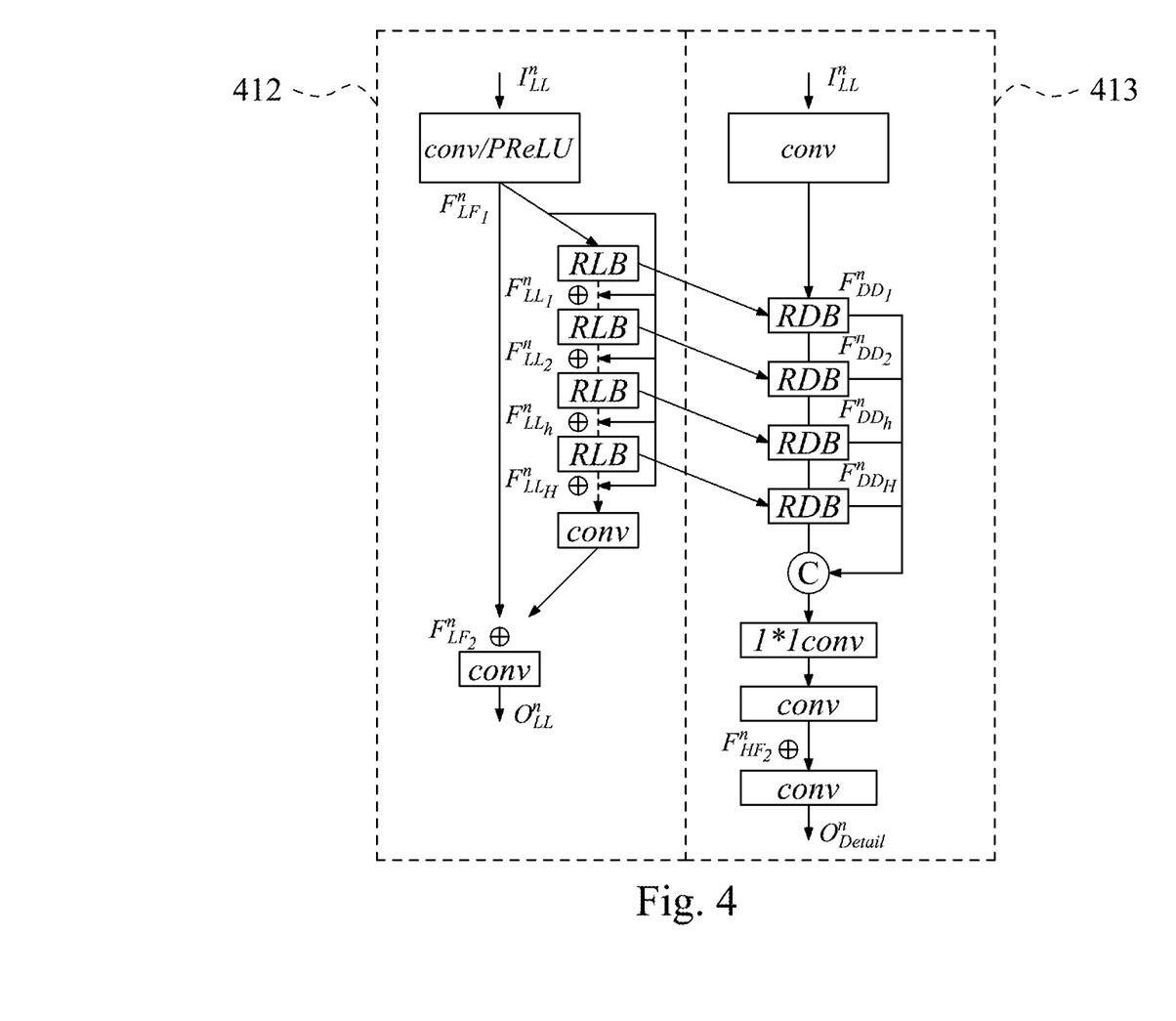
FIG. 4 shows a schematic view of a low-frequency deraining model and a high-frequency deraining model of the WAAR of FIG. 2.

Please refer to FIG. 4. FIG. 4 shows a schematic view of the low-frequency deraining model 412 and the high-frequency deraining model 413 of the WAAR 110 of FIG. 2. In FIG. 4, the low-frequency deraining model 412 in the image deraining step S02 can include a convolution operation conv, an activation function PReLU and a plurality of residual blocks RLB. $I_{LL}^n$ represents an n-th stage low-frequency wavelet coefficient, $O_{LL}^n$ represents an n-th stage low-frequency derain image, $F_{LF_1}^n$ represents a shallow feature extracted from $I_{LL}^n$, $F_{LL_1}^n$ represents a calculation result of the first RLB, $F_{LL_2}^n$ represents a calculation result of the second RLB, and so on to $F_{LL_h}^n$ represents a calculation result of the h-th RLB, $F_{LL_H}^n$ represents a calculation result of the H-th RLB. In particular, $F_{LF_2}^n$ is a residual feature fusion result, which represents that $F_{LL_1}^n$ goes through the H residual blocks RLB for the deep feature extraction and the residual learning to generate $F_{LL_H}^n$, and then performs the convolution operation conv on $F_{LL_H}^n$, and finally adds the shallow feature $F_{LF_1}^n$ to $F_{LL_H}^n$, so that $F_{LF_2}^n$ is obtained. h and H are both positive integers.

On the other hand, the high-frequency deraining model 413 can include a convolution operation conv, a 1*1 convolution operation 1*1conv, a concatenation function C and a plurality of residual dense blocks RDB. $I_{Detail}^n$ represents an n-th stage high-frequency wavelet coefficient, $O_{Detail}^n$ represents an n-th stage high-frequency derain image, $F_{HF_1}^n$ represents a shallow feature extracted from $I_{Detail}^n$, $F_{DD_1}^n$ represents a calculation result of the first RDB, $F_{DD_2}^n$ represents a calculation result of the second RDB, and so on to $F_{DD_h}^n$ represents a calculation result of the h-th RDB, and $F_{DD_h}^n$ represents a calculation result of the H-th RDB. In particular, $F_{HF_2}{}^n$ is a global feature connection result which represents that $F_{HF_1}{}^n$ goes through the H residual dense blocks RDB for the deep feature extraction and the residual learning to generate a plurality of operation results (i.e., $F_{DD_1}{}^n$ to $F_{DD_H}{}^n$), and then the aforementioned operation results are processed in sequence through the concatenation function C, the 1*1 convolution operation 1*1conv and the convolution operation conv, and finally adds the shallow feature $F_{HF_1}{}^n$ to the aforementioned operation results, so that $F_{LF_2}{}^n$ is obtained.

The low-frequency deraining model 412 and the high-frequency deraining model 413 in the WAAR 110 can form a deep network having the high-frequency blocks connected to the low-frequency blocks; in other words, the residual blocks RLB of the low-frequency deraining model 412 is connected to the residual dense blocks RDB of the high-frequency deraining model 413, respectively so as to extract the richer image features, which are beneficial to obtain the potential dependence between the high-frequency features and the high-frequency features, so that the high-frequency deraining model 413 can remove the rain patterns more effectively in the high-frequency part. The training methods of the low-frequency deraining model 412 and the high-frequency deraining model 413 of the present disclosure is then described in the following paragraphs.

First, storing a training image pair of a rain image and a rainless image $\{y_i, x_i\}_{i=1,\ldots,m}$ into a storage unit, wherein m is a number of the training image pair. The processing unit is connected to the storage unit, and carries out the n stage stationary wavelet transform (n=1, 2, ..., N) on the rain image and the rainless image to obtain an n-th stage rain image $y_{i,n}$ and an n-th rainless image $x_{i,n}$, and conform to two following equations (3) and (4):

$$y_{i,n} = \{y_{i,n}^{LL}, y_{i,n}^{Detail}\} \quad (3);$$

$$x_{i,n} = \{x_{i,n}^{LL}, x_{i,n}^{Detail}\} \quad (4).$$

Then, the processing unit updates a parameter of the low-frequency deraining model 412 and the high-frequency deraining model 413 according to a loss function, and the loss function and the parameter conform to a following equation (5):

$$\text{Loss}(w) = \frac{1}{m}\sum_{i=1}^{m}\sum_{n=1}^{N}\|H(y_{i,n}^{Detail};w) - x_{i,n}^{Detail}\| + \frac{1}{m}\sum_{i=1}^{m}\sum_{n=1}^{N-1}\|L(y_{i,n}^{LL};w) - x_{i,n}^{LL}\|^2 + \frac{1}{m}\sum_{i=1}^{m}\|L(y_{i,N}^{LL};w) - x_{i,N}^{LL}\|^2. \quad (5)$$

Loss is the loss function, w is the parameter of the low-frequency deraining model 412 and the high-frequency deraining model 413, i is the training image pair, m is the number of the training image pair, n is a stage of a wavelet transformation (i.e., the stationary wavelet transform), N is a number of the stage, $y_{i,n}^{LL}$ is an n-th stage low-frequency rain image, $x_{i,n}^{LL}$ is an n-th stage low-frequency rainless image, $y_{i,n}^{Detail}$ is an n-th stage high-frequency rain image, $x_{i,n}^{Detail}$ is an n-th stage high-frequency rainless image, $y_{i,N}^{LL}$ is an N-th stage low-frequency rain image, and $x_{i,N}^{LL}$ is an N-th stage low-frequency rainless image. In detail, w is the parameter represented the entire model. The parameter w is optimized by a backpropagation, and the processing unit uses the loss function Loss to train the parameter w, so that the parameter w can jointly estimate the n-th stage low-frequency rain image $y_{i,n}^{LL}$, the n-th stage high-frequency rain image $y_{i,n}^{Detail}$, the n-th stage low-frequency rainless image $x_{i,n}^{LL}$ and the n-th stage high-frequency rainless image $x_{i,n}^{Detail}$.

Please refer to FIGS. 1 and 2. In the first inverse wavelet transforming step S03, the first inverse wavelet transforming procedure 414 is a reverse procedure of the wavelet transforming procedure 411, and is mainly configured to perform a reverse Haar Wavelet on the second stage low-frequency derain image $O_{LL}^2$ and the second stage high-frequency derain images $O_{Detail}^2$; in other words, the first inverse wavelet transforming procedure 414 converts the wavelet coefficients corresponding to the second stage low-frequency derain image $O_{LL}^2$ and the second stage high-frequency derain images $O_{Detail}^2$ from the frequency domain back to the space domain to recompose the second stage derain image $DR^2$.

In the weighted blending step S04, the weighted blending procedure 415 includes a weighted blending function, a weighted value, the first stage low-frequency derain image and the second stage derain image. The weighted blending function is represented as IWB, the weighted value is represented as $\alpha$, the first stage low-frequency derain image is represented as image1, and the second stage derain image is represented as image2, and conforms to a following equation (6):

$$IWB = \text{image1}*(1.0-\alpha) + \text{image2}*\alpha \quad (6).$$

In addition, the weighted value $\alpha$ in the first embodiment can be 0.5, but the present disclosure is not limited thereto.

It is worth explaining that the second inverse wavelet transforming procedure 416 in the second inverse wavelet transforming step S05 includes an inverse wavelet transforming function, a concatenation function, a weighted blending function, the first stage low-frequency derain image, the second stage low-frequency derain image, the first stage high-frequency derain images, the second stage high-frequency derain images and the final derain image. The inverse wavelet transforming function is represented as ISWT, the concatenation function is represented as concat, the weighted blending function is represented as IWB, the first stage low-frequency derain image is represented as $O_{LL}^1$, the second stage low-frequency derain image is represented as $O_{LL}^2$, the first stage high-frequency derain images are represented as $O_{Detail}^1$, the second stage high-frequency derain images are represented as $O_{Detail}^2$, and the final derain image is represented as $C^1$, and conforms to a following equation (7):

$$C^1 = \text{ISWT}(O_{Detail}^1, \text{IWB}(O_{LL}^1, \text{ISWT}(\text{concat}(O_{LL}^2, O_{Detail}^2)))) \quad (7).$$

The single image deraining method 100 of the present disclosure compared with the conventional image deraining method not only removes rain for the last stage low-frequency rain image, but retains the high-frequency wavelet coefficients and the low-frequency wavelet coefficients in each stage, and then input the low-frequency rain image decomposed by the stationary wavelet transform in the each stage to the low-frequency deraining model 412 for deraining. Therefore, the low-frequency rain patterns can be eliminated effectively and recursively through the weighted blending function IWB and the inverse wavelet transforming function ISWT, and then restores to the final derain image $C^1$ having a clean background.

Figure 5:
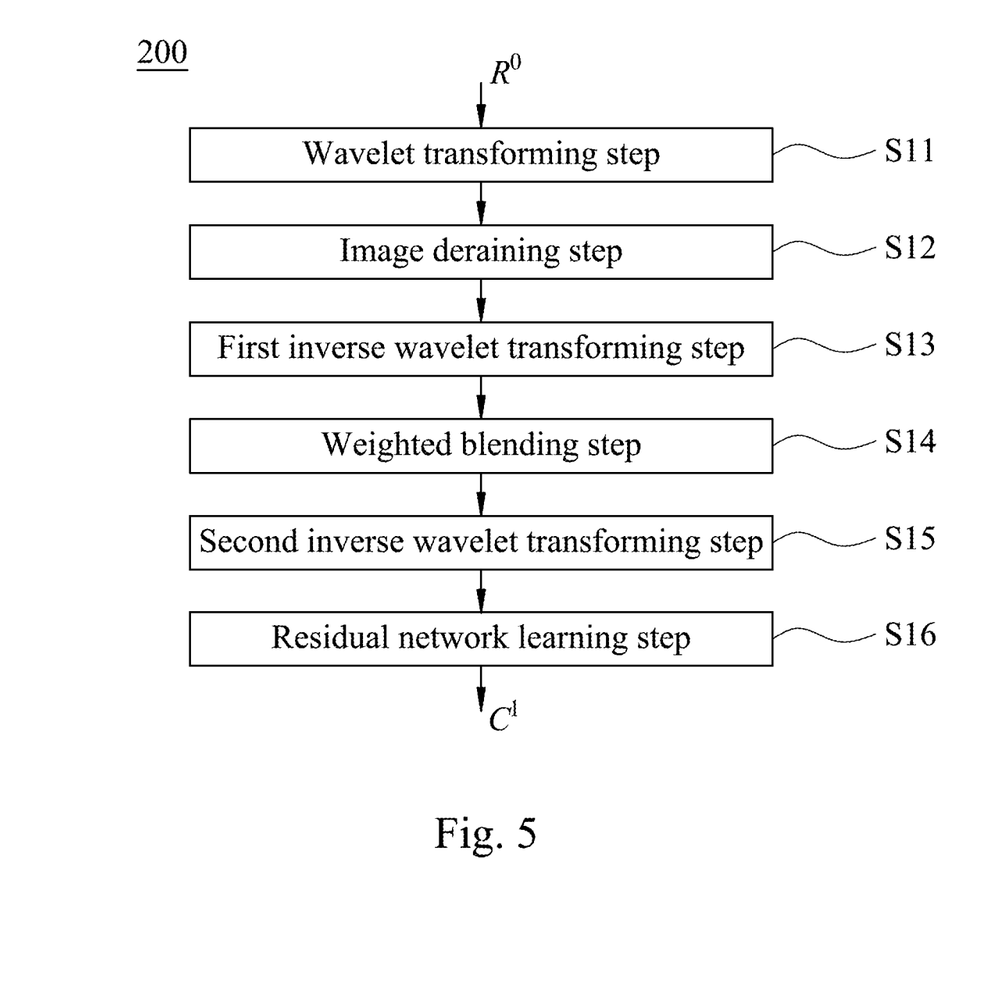
FIG. 5 shows a flow chart of a single image deraining method according to a second embodiment of the present disclosure.
Figure 6:
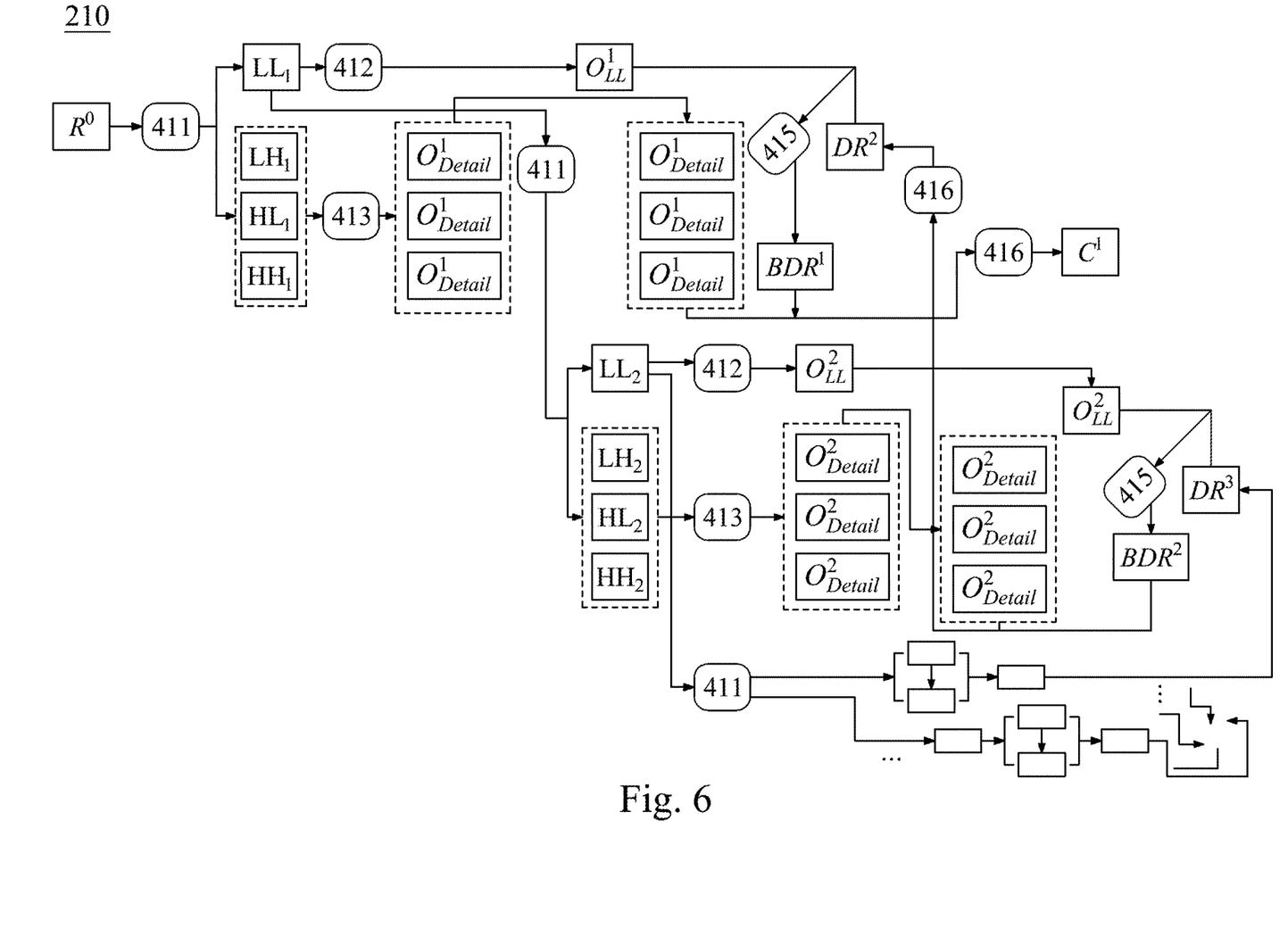
FIG. 6 shows a schematic view of a WAAR (i is 1 to n) of the single image deraining method of the second embodiment of the present disclosure.

Please refer to FIGS. 5 and 6. FIG. 5 shows a flow chart of a single image deraining method 200 according to a second embodiment of the present disclosure. FIG. 6 shows a schematic view of a WAAR 210 (i is 1 to n) of the single image deraining method 200 of the second embodiment of the present disclosure. In FIGS. 5 and 6, the single image deraining method 200 is configured to convert an initial rain image $R^0$ into a final derain image $C^1$, and includes performing a wavelet transforming step S11, an image deraining step S12, a first inverse wavelet transforming step S13, a weighted blending step S14, a second inverse wavelet transforming step S15 and a residual network learning step S16.

The wavelet transforming step S11 is performed to drive a processing unit to process the initial rain image $R^0$ to generate an i-th stage low-frequency rain image and a plurality of i-th stage high-frequency rain images according to a wavelet transforming procedure 411, wherein i is 1 to n, i and n are both positive integers, and n is greater than or equal to 3. In specific, the processing unit performs the n stage stationary wavelet transform on the initial rain image $R^0$ according to the wavelet transforming procedure 411 to generate a first stage low-frequency rain image $LL_1$, a plurality of first stage high-frequency rain images $LH_1$, $HL_1$, $HH_1$, a second stage low-frequency rain image $LL_2$ and a plurality of second stage high-frequency rain images $LH_2$, $HL_2$, $HH_2$, and so on to generate an n-th stage low-frequency rain image and a plurality of n-th stage high-frequency rain images.

The image deraining step S12 is performed to drive the processing unit to input the first stage low-frequency rain image $LL_1$ and the second stage low-frequency rain image $LL_2$ to a low-frequency deraining model 412 to output a first stage low-frequency derain image $O_{LL}^1$ and a second stage low-frequency derain image $O_{LL}^2$, and input the first stage high-frequency rain images $LH_1$, $HL_1$, $HH_1$ and the second stage high-frequency rain images $LH_2$, $HL_2$, $HH_2$ to a high-frequency deraining model 413 to output a plurality of first stage high-frequency derain images $O_{Detail}^1$ and a plurality of second stage high-frequency derain images $O_{Detail}^2$, and so on to input the i-th stage low-frequency rain image to the low-frequency deraining model 412 to output an i-th stage low-frequency derain image, and input the i-th stage high-frequency rain images to the high-frequency deraining model 413 to output a plurality of i-th stage high-frequency derain images.

The first inverse wavelet transforming step S13 is performed to drive the processing unit to recombine the n-th stage low-frequency derain image with the n-th stage high-frequency rain images to form an n-th stage derain image according to a first inverse wavelet transforming procedure 414.

The weighted blending step S14 is performed to drive the processing unit to blend the (n−1)-th stage low-frequency derain image with the n-th stage derain image to generate a (n−1)-th stage blended derain image according to a weighted blending procedure 415.

The second inverse wavelet transforming step S15 is performed to drive the processing unit to recombine the (n−1)-th stage high-frequency derain images with the (n−1)-th stage blended derain image to form a (n−1)-th stage derain image according to a second inverse wavelet transforming procedure 416, and then the processing unit sets n to n−1.

The residual network learning step S16 is performed to drive the processing unit to repeatedly execute the weighted blending step S14 and the second inverse wavelet transforming step S15 according to n until n=2. In response to determining that n=2 in the residual network learning step S16, the (n−1)-th stage derain image of the second inverse wavelet transforming step S15 is the final derain image $C^1$.

The details of the abovementioned steps are then described below through more detailed embodiments.

Figure 7:
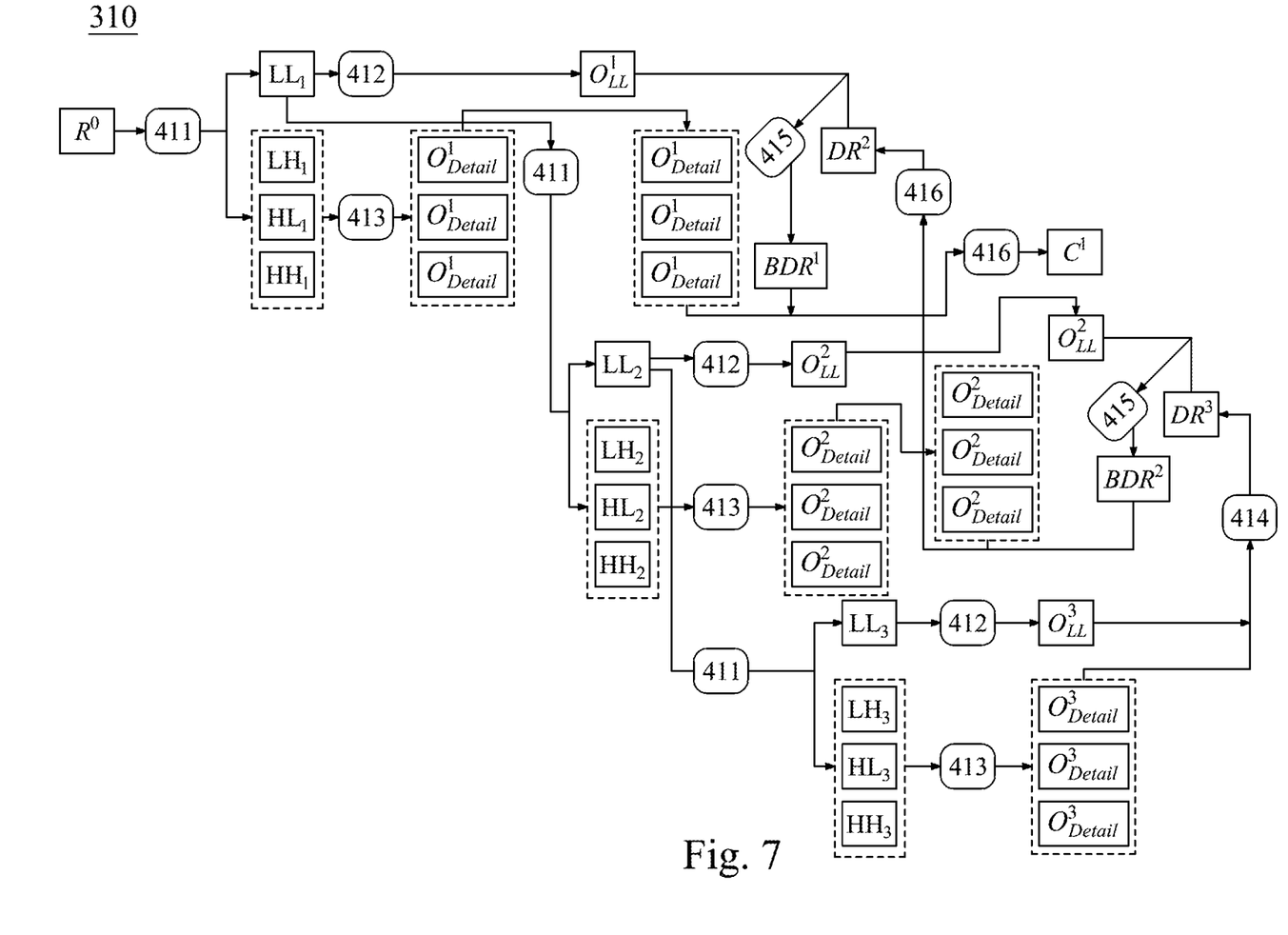
FIG. 7 shows a schematic view of a WAAR (i is 1 to 3) of a single image deraining method according to a third embodiment of the present disclosure.

Please refer to FIGS. 5 and 7. FIG. 7 shows a schematic view of a WAAR 310 (i is 1 to 3) of a single image deraining method according to a third embodiment of the present disclosure. The steps of the single image deraining method (not shown) of the third embodiment are the same as the steps of the single image deraining method 200 of the second embodiment. In specific, setting n of the single image deraining method 200 of the second embodiment to 3 is the single image deraining method of the third embodiment.

In FIGS. 5 and 7, the wavelet transforming step S11 is performed to drive the processing unit to process the initial rain image $R^0$ to generate a first stage low-frequency rain image $LL_1$, a plurality of first stage high-frequency rain images $LH_1$, $HL_1$, $HH_1$, a second stage low-frequency rain image $LL_2$ and a plurality of second stage high-frequency rain images $LH_2$, $HL_2$, $HH_2$, a third stage low-frequency rain image $LL_3$ and a plurality of third stage high-frequency rain images $LH_3$, $HL_3$, $HH_3$ according to the wavelet transforming procedure 411.

The image deraining step S12 is performed to drive the processing unit to input the first stage low-frequency rain image $LL_1$, the second stage low-frequency rain image $LL_2$ and the third stage low-frequency rain image $LL_3$ to the low-frequency deraining model 412 to output a first stage low-frequency derain image $O_{LL}^1$, a second stage low-frequency derain image $O_{LL}^2$, and a third stage low-frequency derain image $O_{LL}^3$, and input the first stage high-frequency rain images $LH_1$, $HL_1$, $HH_1$, the second stage high-frequency rain images $LH_2$, $HL_2$, $HH_2$ and the third stage high-frequency rain images $LH_3$, $HL_3$, $HH_3$ to the high-frequency deraining model 413 to output a plurality of first stage high-frequency derain images $O_{Detail}^1$, a plurality of second stage high-frequency derain images $O_{Detail}^2$ and a plurality of third stage high-frequency derain images $O_{Detail}^3$.

The first inverse wavelet transforming step S13 is performed to drive the processing unit to recombine the third stage low-frequency derain image $O_{LL}^3$ with the third stage high-frequency derain images $O_{Detail}^3$ to form a third stage derain image $DR^3$ according to the first inverse wavelet transforming procedure 414.

The weighted blending step S14 is performed to drive the processing unit to blend the second stage low-frequency derain image $O_{LL}^2$ with the third stage derain image $DR^3$ to generate a second stage blended derain image $BDR^2$ according to the weighted blending procedure 415.

The second inverse wavelet transforming step S15 is performed to drive the processing unit to recombine the second stage high-frequency derain images $O_{Detail}^2$ with the second stage blended derain image $BDR^2$ to form a second stage derain image $DR^2$ according to the second inverse wavelet transforming procedure 416, and then the processing unit sets n (i.e., 3) to n−1 (i.e., 2).

The residual network learning step S16 is performed to drive the processing unit to repeatedly execute the weighted blending step S14 and the second inverse wavelet transforming step S15 according to the reset n (i.e., 2) until n=2. Since the reset n is already equal to 2, the processing unit only needs to execute the weighted mixing step S14 and the second inverse wavelet transform step S15 again (i.e., execute a next weighted mixing step S14 and a next second inverse wavelet transforming step S15).

The next weighted mixing step S14 is performed to drive the processing unit to blend the first stage low-frequency derain image $O_{LL}^1$ with the second stage derain image $DR^2$ to generate a first stage blended derain image $BDR^1$ according to the weighted blending procedure 415.

The next second inverse wavelet transforming step S15 is performed to drive the processing unit to recombine the first stage high-frequency derain images $O_{Detail}^1$ with the first stage blended derain image $BDR^1$ to form a first stage derain image according to the second inverse wavelet transforming procedure 416, and the first stage derain image is the final derain image $C^1$.

Therefore, the single image deraining method 200 of the second embodiment or the single image deraining method of the third embodiment performs multi-stages stationary wavelet transform to decompose the initial rain image $R^0$, and focuses on the low-frequency rain image in each stage to perform the inverse stationary wavelet transform and the image weighted blending so as to effectively remove the rain patterns of the low-frequency rain image in each stage.

Figure 8:
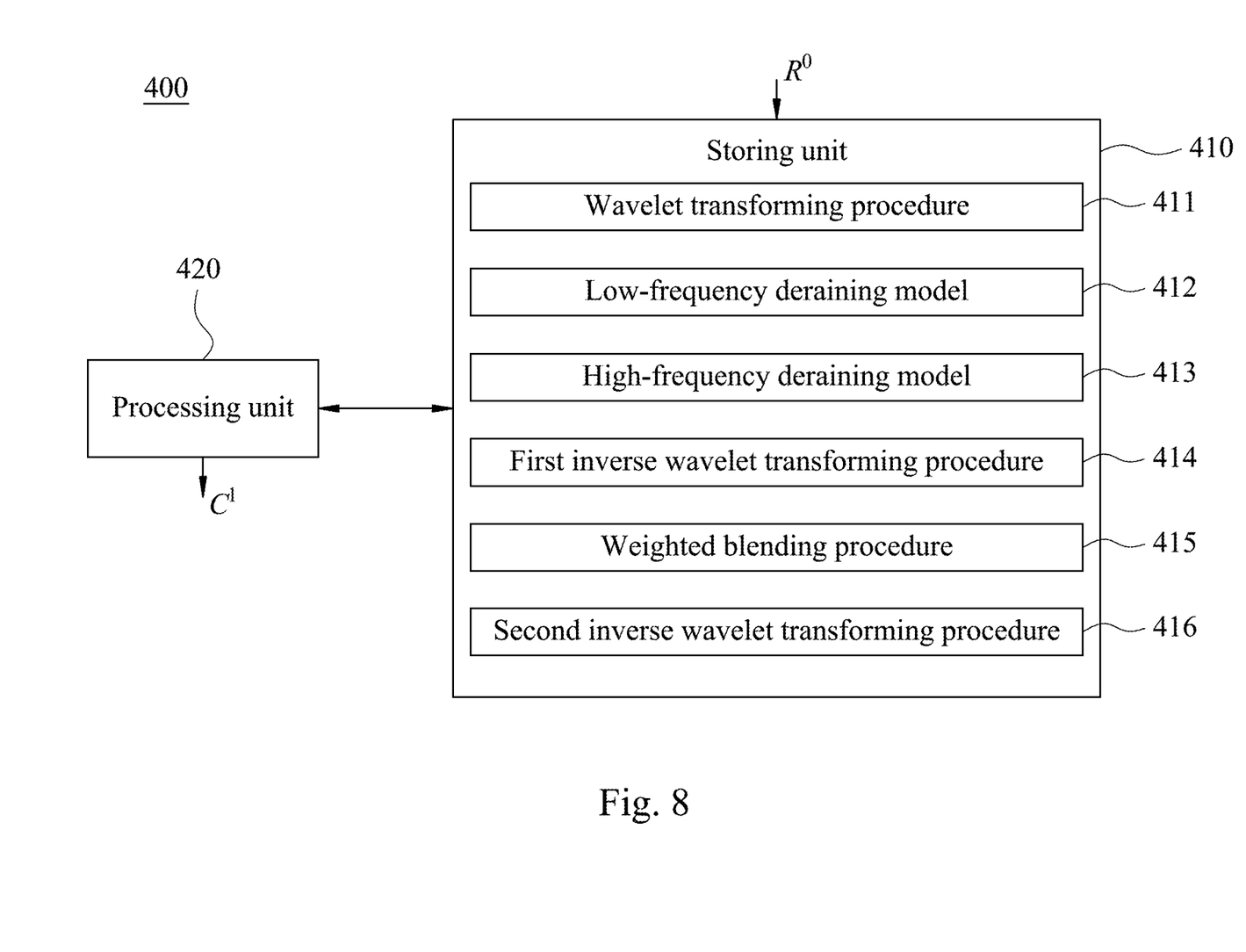
FIG. 8 shows a block diagram of a single image deraining system according to a fourth embodiment of the present disclosure.

Please refer to FIGS. 1-2 and 8. FIG. 8 shows a block diagram of a single image deraining system 400 according to a fourth embodiment of the present disclosure. In FIGS. 1-2 and 8, the single image deraining system 400 is configured to convert an initial rain image $R^0$ into a final derain image $C^1$, and includes a storing unit 410 and a processing unit 420.

The storing unit 410 is configured to access the initial rain image $R^0$, a wavelet transforming procedure 411, a low-frequency deraining model 412, a high-frequency deraining model 413, a first inverse wavelet transforming procedure 414, a weighted blending procedure 415 and a second inverse wavelet transforming procedure 416. The processing unit 420 is connected to the storing unit 410 and configured to implement the single image deraining method 100, 200. In detail, the processing unit 420 can be a Digital Signal Processor (DSP), a Micro Processing Unit (MPU), a Central Processing Unit (CPU) or other electronic processors, but the present disclosure is not limited thereto. Therefore, the single image deraining system 400 of the present disclosure decomposes the initial rain image $R^0$ through the stationary wavelet transform, and uses the low-frequency deraining model 412 and the high-frequency deraining model 413 to remove the rain patterns. Then, performing the inverse wavelet transforming function ISWT and the weighted blending function IWB on the previous low-frequency rain image to restore the initial rain image $R^0$ to the final derain image $C^1$ having a clean background.

In summary, the present disclosure has the following advantages. First, decomposing the initial rain image through multi-stages stationary wavelet transform, and retaining the high-frequency coefficients and the low-frequency coefficients in each stage, and then focusing on the low-frequency rain image in each stage to perform the inverse wavelet transforming function ISWT and the weighted blending function IWB so as to effectively remove the rain patterns of the low-frequency rain image in each stage. Second, as the residual blocks of the low-frequency deraining model and the residual dense blocks of the high-frequency deraining model are connected to each other, it is favorable for helping the high-frequency deraining model to remove the rain patterns more effectively in the high-frequency part. Third, the present disclosure not only performs deraining for the last stage low-frequency rain image, but also inputs the low-frequency rain image in each stage into the low-frequency deraining model for rain removing so as to avoid the situation that the edge of the derain image is blurred.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A single image deraining method for converting an initial rain image into a final derain image, the single image deraining method comprising:

performing a wavelet transforming step to drive a processing unit to process the initial rain image to generate a first stage low-frequency rain image, a plurality of first stage high-frequency rain images, a second stage low-frequency rain image and a plurality of second stage high-frequency rain images according to a wavelet transforming procedure;

performing an image deraining step to drive the processing unit to input the first stage low-frequency rain image and the second stage low-frequency rain image to a low-frequency deraining model to output a first stage low-frequency derain image and a second stage low-frequency derain image, and input the first stage high-frequency rain images and the second stage high-frequency rain images to a high-frequency deraining model to output a plurality of first stage high-frequency derain images and a plurality of second stage high-frequency derain images;

performing a first inverse wavelet transforming step to drive the processing unit to recombine the second stage low-frequency derain image with the second stage high-frequency rain images to form a second stage derain image according to a first inverse wavelet transforming procedure;

performing a weighted blending step to drive the processing unit to blend the first stage low-frequency derain image with the second stage derain image to generate a first stage blended derain image according to a weighted blending procedure; and performing a second inverse wavelet transforming step to drive the processing unit to recombine the first stage high-frequency derain images with the first stage blended derain image to form the final derain image according to a second inverse wavelet transforming procedure;

wherein the second inverse wavelet transforming procedure comprises an inverse wavelet transforming function, a concatenation function, a weighted blending function, the first stage low-frequency derain image, the second stage low-frequency derain image, the first stage high-frequency derain images, the second stage high-frequency derain images and the final derain image, the inverse wavelet transforming function is represented as ISWT, the concatenation function is represented as concat, the weighted blending function is represented as IWB, the first stage low-frequency derain image is represented as $O_{LL}^1$, the second stage low-frequency derain image is represented as $O_{LL}^2$, the first stage high-frequency derain images are represented as $O_{Detail}^1$, the second stage high-frequency derain images are represented as $O_{Detail}{}^2$, and the final derain image is represented as $C^1$, and conforms to a following equation:

$$C^1=\text{ISWT}(O_{Detail}{}^1,\text{IWB}(O_{LL}{}^1,\text{ISWT}(\text{concat}(O_{LL}{}^2, O_{Detail}{}^2)))).$$

2. The single image deraining method of claim 1, wherein the wavelet transforming step comprises:
   performing a first stage wavelet decomposing step to drive the processing unit to decompose the initial rain image into the first stage low-frequency rain image and the first stage high-frequency rain images according to the wavelet transforming procedure; and
   performing a second stage wavelet decomposing step to drive the processing unit to decompose the first stage low-frequency rain image into the second stage low-frequency rain image and the second stage high-frequency rain images according to the wavelet transforming procedure.

3. The single image deraining method of claim 1, wherein the wavelet transforming procedure comprises a wavelet transforming function, the initial rain image, a first stage low-frequency wavelet coefficient, a plurality of first stage high-frequency wavelet coefficients, a second stage low-frequency wavelet coefficient and a plurality of second stage high-frequency wavelet coefficients, the wavelet transforming function is represented as SWT, the initial rain image is represented as $R^0$, the first stage low-frequency wavelet coefficient is represented as $I_{LL}{}^1$, the first stage high-frequency wavelet coefficients are represented as $I_{LH}{}^1$, $I_{HL}{}^1$ and $I_{HH}{}^1$, respectively, the second stage low-frequency wavelet coefficient is represented as $I_{LL}{}^2$, and the second stage high-frequency wavelet coefficients are represented as $I_{LH}{}^2$, $I_{HL}{}^2$ and $I_{HH}{}^2$, respectively, and conform to a following equation:

$$SWT(R^0)=[I_{LL}{}^1,I_{LH}{}^1,I_{HL}{}^1,I_{HH}{}^1];$$

$$SWT(I_{LL}{}^1)=[I_{LL}{}^2,I_{LH}{}^2,I_{HL}{}^2,I_{HH}{}^2].$$

4. The single image deraining method of claim 1, wherein the weighted blending procedure comprises the weighted blending function, a weighted value, the first stage low-frequency derain image and the second stage derain image, the weighted blending function is represented as IWB, the weighted value is represented as $\alpha$, the first stage low-frequency derain image is represented as image1, and the second stage derain image is represented as image2, and conforms to a following equation:

$$IWB=\text{image1}*(1.0-\alpha)+\text{image2}*\alpha.$$

5. The single image deraining method of claim 1, wherein the processing unit updates a parameter of the low-frequency deraining model and the high-frequency deraining model according to a loss function, and the loss function and the parameter conform to a following equation:

$$\text{Loss}(w) = \frac{1}{m}\sum_{i=1}^{m}\sum_{n=1}^{N}\left\|H\left(y_{i,n}^{Detail}; w\right) - x_{i,n}^{Detail}\right\| +$$

$$\frac{1}{m}\sum_{i=1}^{m}\sum_{n=1}^{N-1}\left\|L\left(y_{i,n}^{LL}; w\right) - x_{i,n}^{LL}\right\|^2 + \frac{1}{m}\sum_{i=1}^{m}\left\|L\left(y_{i,N}^{LL}; w\right) - x_{i,N}^{LL}\right\|^2;$$

wherein Loss is the loss function, W is the parameter, i is a training image pair, m is a number of the training image pair, n is a stage of a wavelet transformation, N is a number of the stage, $y_{i,n}^{LL}$ is an n-th stage low-frequency rain image, $x_{i,n}^{LL}$ is an n-th stage low-frequency rainless image, $y_{i,n}^{Detail}$ is an n-th stage high-frequency rain image, $x_{i,n}^{Detail}$ is an n-th stage high-frequency rainless image, $y_{i,N}^{LL}$ is an N-th stage low-frequency rain image, and $x_{i,N}^{LL}$ is an N-th stage low-frequency rainless image.

6. A single image deraining method for converting convert an initial rain image into a final derain image, the single image deraining method comprising:
   performing a wavelet transforming step to drive a processing unit to process the initial rain image to generate an i-th stage low-frequency rain image and a plurality of i-th stage high-frequency rain images according to a wavelet transforming procedure, wherein i is 1 to n, i and n are both positive integers, and n is greater than or equal to 3;
   performing an image deraining step to drive the processing unit to input the i-th stage low-frequency rain image to a low-frequency deraining model to output an i-th stage low-frequency derain image, and input the i-th stage high-frequency rain images to a high-frequency deraining model to output a plurality of i-th stage high-frequency derain images;
   performing a first inverse wavelet transforming step to drive the processing unit to recombine the n-th stage low-frequency derain image with the n-th stage high-frequency rain images to form an n-th stage derain image according to a first inverse wavelet transforming procedure;
   performing a weighted blending step to drive the processing unit to blend the (n−1)-th stage low-frequency derain image with the n-th stage derain image to generate a (n−1)-th stage blended derain image according to a weighted blending procedure;
   performing a second inverse wavelet transforming step to drive the processing unit to recombine the (n−1)-th stage high-frequency derain images with the (n−1)-th stage blended derain image to form a (n−1)-th stage derain image according to a second inverse wavelet transforming procedure, and set n to n−1; and
   performing a residual network learning step to drive the processing unit to repeatedly execute the weighted blending step and the second inverse wavelet transforming step according to n until n=2;
   wherein in response to determining that n=2 in the residual network learning step, the (n−1)-th stage derain image of the second inverse wavelet transforming step is the final derain image;
   wherein in response to determining that n=2, the second inverse wavelet transforming procedure comprises an inverse wavelet transforming function, a concatenation function, a weighted blending function, the first stage low-frequency derain image, the second stage low-frequency derain image, the first stage high-frequency derain images, the second stage high-frequency derain images and the final derain image, the inverse wavelet transforming function is represented as ISWT, the concatenation function is represented as concat, the weighted blending function is represented as IWB, the first stage low-frequency derain image is represented as $O_{LL}{}^1$, the second stage low-frequency derain image is represented as $O_{LL}{}^2$, the first stage high-frequency derain images are represented as $O_{Detail}{}^1$, the second stage high-frequency derain images are represented as $O_{Detail}^2$, and the final derain image is represented as $C^1$, and conforms to a following equation:

$$C^1 = \text{ISWT}(O_{Detail}^1, IWB(O_{LL}^1, \text{ISWT}(\text{concat}(O_{LL}^2, O_{Detail}^2)))).$$

7. A single image deraining system, which is configured to convert an initial rain image into a final derain image, the single image deraining system comprising:
a storing unit configured to access the initial rain image, a wavelet transforming procedure, a low-frequency deraining model, a high-frequency deraining model, a first inverse wavelet transforming procedure, a weighted blending procedure and a second inverse wavelet transforming procedure; and
a processing unit connected to the storing unit, wherein the processing unit is configured to implement a single image deraining method comprising:
performing a wavelet transforming step to process the initial rain image to generate a first stage low-frequency rain image, a plurality of first stage high-frequency rain images, a second stage low-frequency rain image and a plurality of second stage high-frequency rain images according to the wavelet transforming procedure;
performing an image deraining step to input the first stage low-frequency rain image and the second stage low-frequency rain image to the low-frequency deraining model to output a first stage low-frequency derain image and a second stage low-frequency derain image, and input the first stage high-frequency rain images and the second stage high-frequency rain images to the high-frequency deraining model to output a plurality of first stage high-frequency derain images and a plurality of second stage high-frequency derain images;
performing a first inverse wavelet transforming step to recombine the second stage low-frequency derain image with the second stage high-frequency rain images to form a second stage derain image according to the first inverse wavelet transforming procedure;
performing a weighted blending step to blend the first stage low-frequency derain image with the second stage derain image to generate a first stage blended derain image according to the weighted blending procedure; and
performing a second inverse wavelet transforming step to recombine the first stage high-frequency derain images with the first stage blended derain image to form the final derain image according to the second inverse wavelet transforming procedure;
wherein the second inverse wavelet transforming procedure comprises an inverse wavelet transforming function, a concatenation function, a weighted blending function, the first stage low-frequency derain image, the second stage low-frequency derain image, the first stage high-frequency derain images, the second stage high-frequency derain images and the final derain image, the inverse wavelet transforming function is represented as ISWT, the concatenation function is represented as concat, the weighted blending function is represented as IWB, the first stage low-frequency derain image is represented as $O_{LL}^1$, the second stage low-frequency derain image is represented as $O_{LL}^2$, the first stage high-frequency derain images are represented as $O_{Detail}^1$, the second stage high-frequency derain images are represented as $O_{Detail}^2$, and the final derain image is represented as $C^1$, and conforms to a following equation:

$$C^1 = \text{ISWT}(O_{Detail}^1, IWB(O_{LL}^1, \text{ISWT}(\text{concat}(O_{LL}^2, O_{Detail}^2)))).$$

8. The single image deraining system of claim 7, wherein the wavelet transforming step comprises:
performing a first stage wavelet decomposing step to drive the processing unit to decompose the initial rain image into the first stage low-frequency rain image and the first stage high-frequency rain images according to the wavelet transforming procedure; and
performing a second stage wavelet decomposing step to drive the processing unit to decompose the first stage low-frequency rain image into the second stage low-frequency rain image and the second stage high-frequency rain images according to the wavelet transforming procedure.

9. The single image deraining system of claim 7, wherein the wavelet transforming procedure comprises a wavelet transforming function, the initial rain image, a first stage low-frequency wavelet coefficient, a plurality of first stage high-frequency wavelet coefficients, a second stage low-frequency wavelet coefficient and a plurality of second stage high-frequency wavelet coefficients, the wavelet transforming function is represented as SWT, the initial rain image is represented as $R^0$, the first stage low-frequency wavelet coefficient is represented as $I_{LL}^1$, the first stage high-frequency wavelet coefficients are represented as $I_{LH}^1$, $I_{HL}^1$ and $I_{HH}^1$, respectively, the second stage low-frequency wavelet coefficient is represented as $I_{LL}^2$, and the second stage high-frequency wavelet coefficients are represented as $I_{LH}^2$, $I_{HL}^2$ and $I_{HH}^2$, respectively, and conform to a following equation:

$$SWT(R^0) = [I_{LL}^1, I_{LH}^1, I_{HL}^1, I_{HH}^1];$$

$$SWT(I_{LL}^1) = [I_{LL}^2, I_{LH}^2, I_{HL}^2, I_{HH}^2].$$

10. The single image deraining system of claim 7, wherein the weighted blending procedure comprises the weighted blending function, a weighted value, the first stage low-frequency derain image and the second stage derain image, the weighted blending function is represented as IWB, the weighted value is represented as $\alpha$, the first stage low-frequency derain image is represented as image1, and the second stage derain image is represented as image2, and conforms to a following equation:

$$IWB = \text{image1} * (1.0 - \alpha) + \text{image2} * \alpha.$$

11. The single image deraining system of claim 7, wherein the processing unit updates a parameter of the low-frequency deraining model and the high-frequency deraining model according to a loss function, and the loss function and the parameter conform to a following equation:

$$\text{Loss}(w) = \frac{1}{m}\sum_{i=1}^{m}\sum_{n=1}^{N}\left\|H\left(y_{i,n}^{Detail}; w\right) - x_{i,n}^{Detail}\right\| +$$

$$\frac{1}{m}\sum_{i=1}^{m}\sum_{n=1}^{N-1}\left\|L\left(y_{i,n}^{LL}; w\right) - x_{i,n}^{LL}\right\|^2 + \frac{1}{m}\sum_{i=1}^{m}\left\|L\left(y_{i,N}^{LL}; w\right) - x_{i,N}^{LL}\right\|^2;$$

wherein Loss is the loss function, W is the parameter, i is a training image pair, m is a number of the training image pair, n is a stage of a wavelet transformation, N is a number of the stage, $y_{i,n}^{LL}$ is an n-th stage low-frequency rain image, $x_{i,n}^{LL}$ is an n-th stage low-frequency rainless image, $y_{i,n}^{Detail}$ is an n-th stage high-frequency rain image, $x_{i,n}^{Detail}$ is an n-th stage high-frequency rainless image, $y_{i,N}^{LL}$ is an N-th stage low-frequency rain image, and $x_{i,N}^{LL}$ is an N-th stage low-frequency rainless image.

* * * * *